March 13, 1962 H. J. LAWRENCE 3,024,646
MILES-PER-GALLON METER
Filed Jan. 23, 1956 3 Sheets-Sheet 1
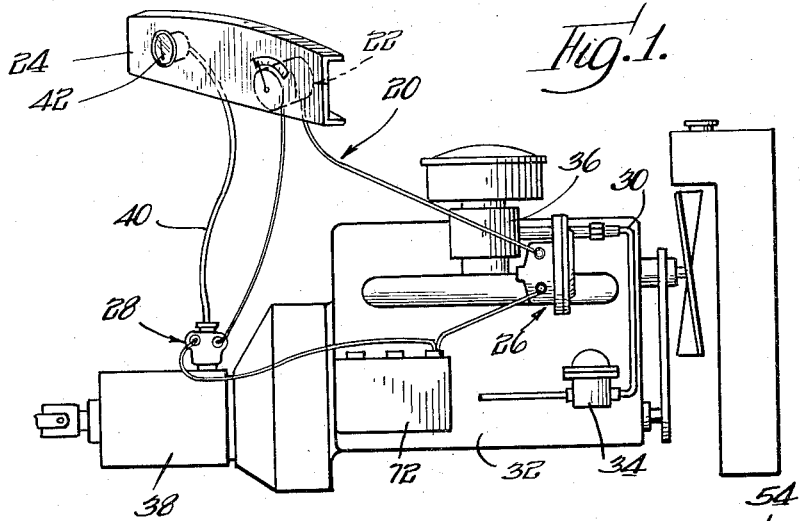
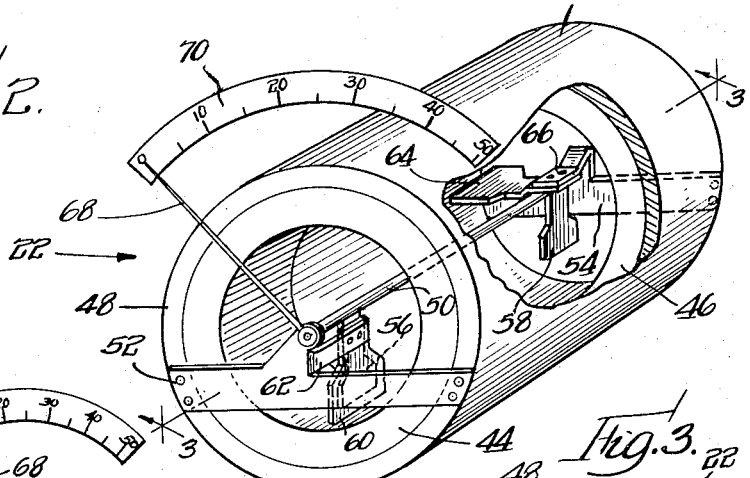
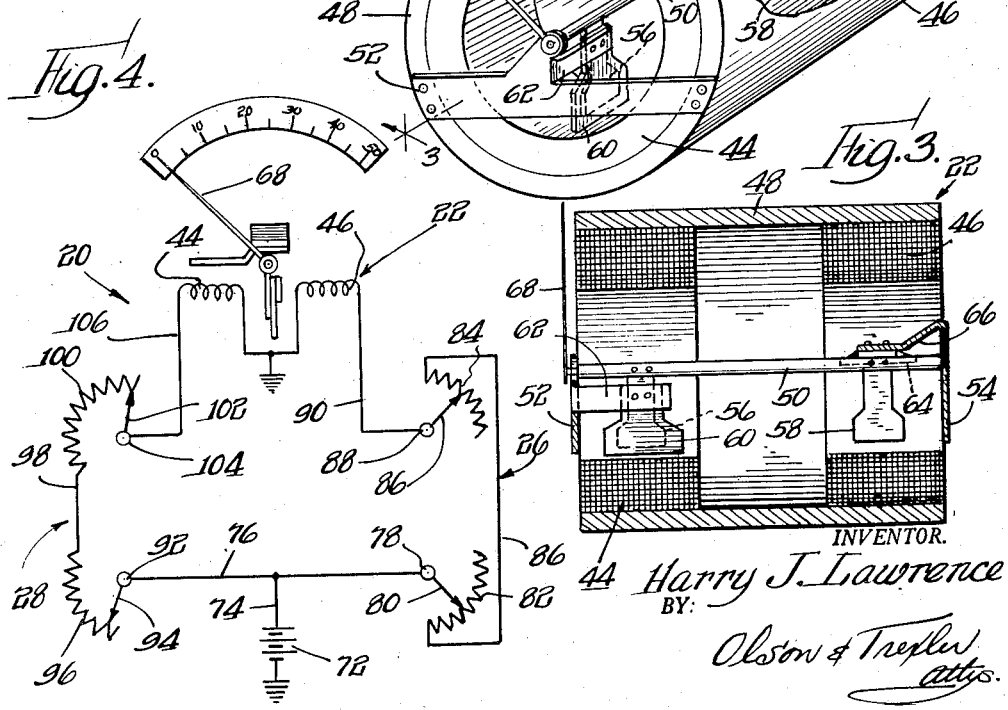
INVENTOR.
Harry J. Lawrence
BY:
Olson & Trexler
attys.

March 13, 1962 H. J. LAWRENCE 3,024,646
MILES-PER-GALLON METER
Filed Jan. 23, 1956 3 Sheets-Sheet 2
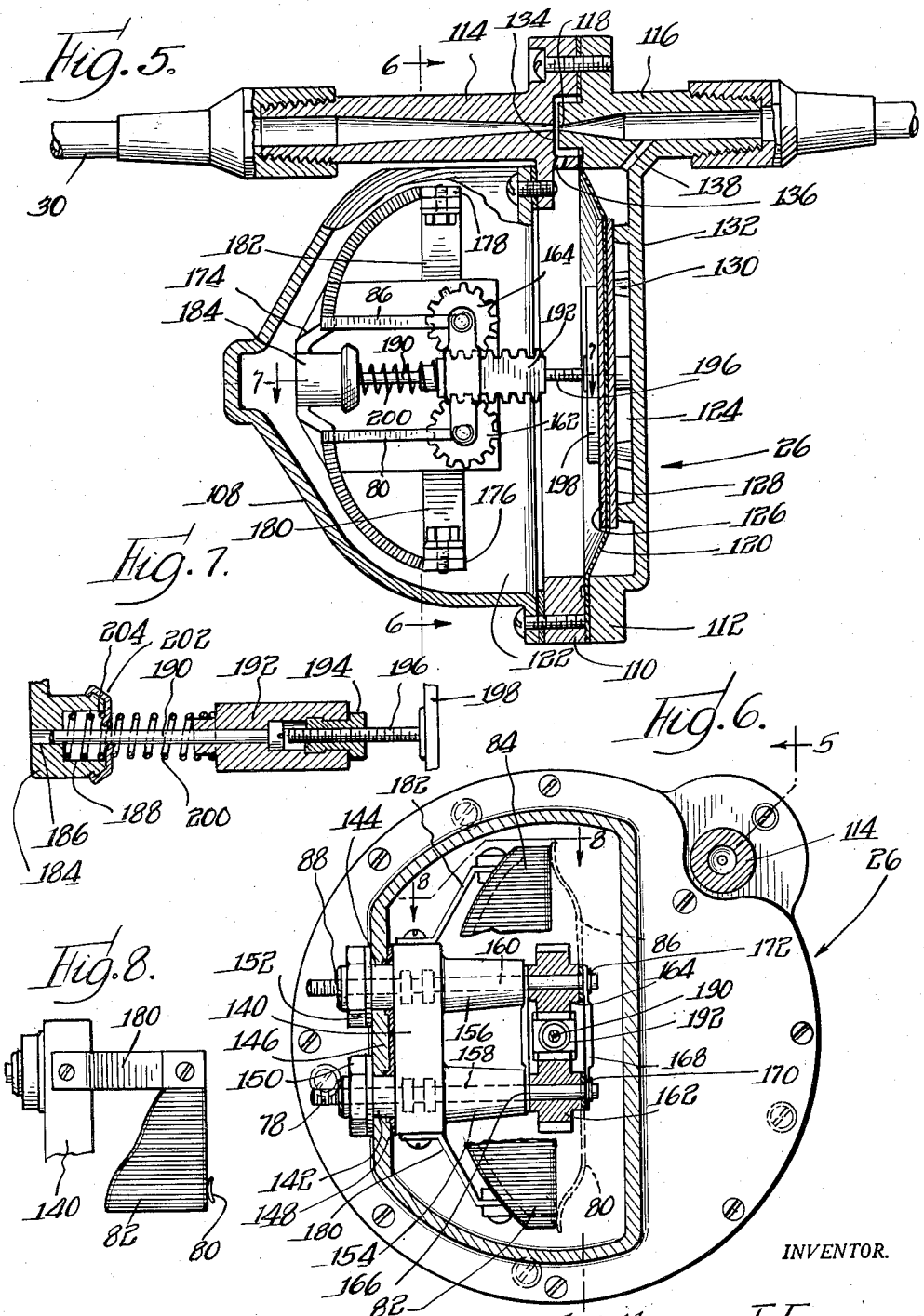
INVENTOR.
Harry J. Lawrence
By: Olson & Trexler
Attys.

March 13, 1962 H. J. LAWRENCE 3,024,646
MILES-PER-GALLON METER
Filed Jan. 23, 1956 3 Sheets-Sheet 3

INVENTOR.
Harry J. Lawrence
BY Olson & Trexler
attys.

3,024,646
MILES-PER-GALLON METER
Harry J. Lawrence, Milwaukee, Wis., assignor to Perc C. Sorenson and Lee Jewell, Wauwatosa, Wis.
Filed Jan. 23, 1956, Ser. No. 560,654
6 Claims. (Cl. 73—114)

The present invention relates to a novel engine efficiency meter, and, more particularly, to a novel miles-per-gallon indicator.

Proposals have heretofore been made for the production of various miles-per-gallon meters. However, such heretofore proposed devices have usually been subject to one or more disadvantages. For example, certain prior meters utilize a pointer movable across a logarithmic scale for indicating the miles per gallon, and such logarithmic scales are relatively difficult to read accurately, especially at their higher values. In addition, certain prior devices are relatively complicated and expensive to manufacture so that they are not commercially feasible, and certain prior devices cannot be easily and/or safely installed in a vehicle so that they are commercially unacceptable.

It is an important object of the present invention to provide a novel miles-per-gallon indicator which is constructed so that it may be easily and accurately read and so that it may be relatively economically manufactured and installed.

Another object of the present invention is to provide a novel engine efficiency meter or miles-per-gallon meter which includes an easily readable lineal scale and which is electrically operated in accordance with engine speed and fuel flow to the engine.

A more specific object of the present invention is to provide a novel miles-per-gallon meter of the above described type which includes novel devices respectively easily installed on an engine transmission and in an engine fuel line for varying units of electricity in accordance with engine speed and fuel flow to the engine, and a novel device that may be easily mounted on the dashboard of a passenger compartment or at any other suitable location and which is electrically connected with the above mentioned devices for providing a quotient of the units of electricity respectively controlled by the speed and fuel flow responsive devices.

Other objects and advantages of the present invention will become apparent from the following description and the accompanying drawings wherein:

FIG. 1 is a somewhat diagrammatic view showing a miles-per-gallon meter incorporating features of the present invention installed on a vehicle engine and dashboard;

FIG. 2 is a perspective view showing the working parts of the novel quotient determining device of the present invention;

FIG. 3 is a sectional view taken along line 3—3 in FIG. 2;

FIG. 4 is a diagrammatic view showing the electrical circuit of the novel miles-per-gallon meter;

FIG. 5 is a sectional view taken along line 5—5 in FIG. 6 showing the novel device adapted to be connected in the engine fuel line for providing variable electrical energy in accordance with the rate of fuel flow;

FIG. 6 is a cross sectional view taken along line 6—6 in FIG. 5;

FIG. 7 is an enlarged fragmentary sectional view taken along line 7—7 in FIG. 5;

FIG. 8 is a fragmentary view taken along line 8—8 in FIG. 6;

Figure 9:
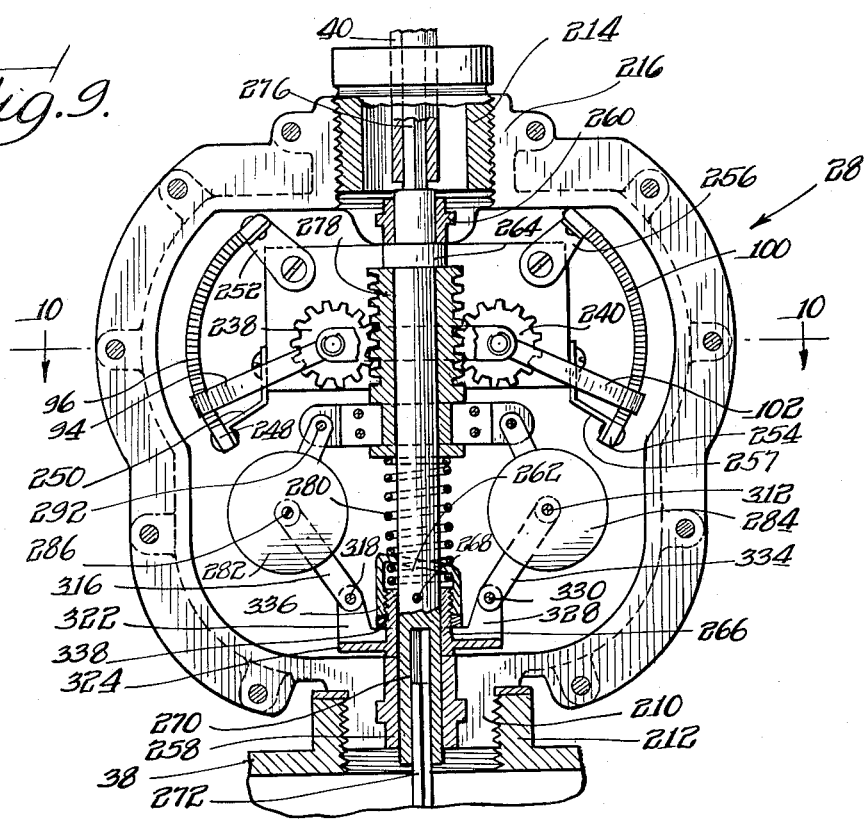
FIG. 9 is a sectional view taken along line 9—9 in FIG. 10 and showing the novel device adapted to be mounted on an engine transmission or providing variable electrical energy in accordance with engine speed.

Referring now more specifically to the drawings wherein like parts are designated by the same numerals throughout the various figures, an engine efficiency meter or miles-per-gallon meter is shown installed in FIG. 1 and includes a quotient determining device 22 mounted on a dashboard 24, a device 26 for providing variable electrical energy in accordance with fuel flow, and a device 28 for providing variable electrical energy in accordance with engine speed. The device 26 is connected in a fuel line 30 of an engine 32 between a fuel pump 34 and the carburetor 36. The device 28 is mounted on the engine transmission 38 and is connected to the standard power take-off provided for the usual speedometer cable. However, with the device 28 installed, the speedometer cable 40 is connected to the device 28 rather than directly to the transmission for operating a speedometer 42.

Referring particularly to FIGS. 2 and 3, it is seen that the quotient determining and indicating device 22 comprises a pair of identical coils 44 and 46 mounted within a shell 48. A rotatable shaft 50 extends through the coils and has opposite ends journalled in frame members 52 and 54 respectively secured to the opposite ends of the shell. A pair of substantially identical soft iron vanes 56 and 58 is secured to the shaft 50, and the vanes are disposed in a common plane and are respectively located within the coils 44 and 46. Another soft iron vane 60 is fixed within the coil 44 for cooperation with the vane 56 and may, for example, be mounted to the fixed frame member 52 by an arm 62. Still another soft iron vane 64 is fixed within the coil 46 for cooperation with the vane 58, which vane 64 is identical to the vane 60 and may be mounted to the fixed frame member 54 by arm 66. It should be noted that the vanes 60 and 64 are offset substantially 90° with respect to each other and are located so that when the shaft rotates in one direction, the movable vane 56 advances toward the fixed vane 60 and the movable vane 58 recedes from the fixed vane 64 and the opposite relative motion takes place when the shaft is rotated in the opposite direction.

In order to actuate the device 22, the coil 44 is electrically energized in response to engine speed and the coil 46 is energized in response to fuel flow in the manner described in detail below. When the coil 44 is energized the cooperable vanes 56 and 60 are magnetized so that like poles are adjacently disposed whereby these vanes repel each other and tend to rotate the shaft 50 in a clockwise direction as viewed in FIG. 2. The cooperable vanes 58 and 64 are similarly magnetized when the coil 46 is energized so as to bias the shaft 50 in a counterclockwise direction as viewed in FIG. 2. When both coils are energized, the shaft 50 which carries a pointer 68 cooperable with a lineally calibrated scale 70 is rotated until the repelling magnetic force between the vanes 56 and 60 is balanced by the repelling magnetic force between the vanes 58 and 64 at which time the shaft comes to rest and a division of the two magnetic forces is effected and the quotient is indicated by the position of the pointer along the scale. Since the magnitudes of the repelling magnetic forces between the pairs of cooperable vanes vary in accordance with the current flowing through the coils, which currents, in turn, vary in response to variations in engine speed and rate of fuel flow, it is seen that the device 22 functions to position the pointer 68 in accordance with the quotient of the engine speed and rate of fuel flow.

As shown in FIG. 4, the coils 44 and 46 are operatively connected with a common source of power such, for example, as a battery 72. One terminal of the battery is grounded and the other terminal is connected by wires 74 and 76 with parallel connected variable resistor means of the devices 26 and 28. As diagrammatically shown in FIG. 4, the variable resistor means of the device 26 comprises a terminal 78 connected with the wire 76, a contact 80 movable along a resistor coil 82 which is connected in series with a second resistor coil 84 by a wire 85. A second movable contact 86 cooperates with the resistor coil 84 and is connected with a terminal 88 which, in turn, is connected with the coil 46 of the device 22 by a wire 90. As is set forth in detail below, means is provided for actuating the contacts or wipers 80 and 86 in unison and in accordance with the rate of fuel flow to the engine. The variable resistor means for the device 28 is similar and includes a terminal 92 connected with the wire 76, a movable contact or wiper 94 operable along a resistance coil 96 which is connected by a wire 98 in series with a second resistance coil 100. A second contact or wiper 102 is cooperable with the coil 100 and is connected with a terminal 104 which, in turn, is connected with the coil 44 by a wire 106. As will be described below, means is provided for actuating the wipers 94 and 102 in unison and in response to engine performance or speed.

In FIGS. 5 through 8 the device 26 for controlling the flow of electrical current in accordance with the rate of fuel flow to the engine is shown in detail. This device comprises a plurality of body members 108, 110 and 112 which are interconnected to provide a sealed housing. The body members 110 and 112 respectively include cooperable sections 114 and 116 which provide a Venturi tube having a restricted throat 118 and adapted to be connected in the fuel line 30. A slack diaphragm including a flexible member 120 having its margin clamped between the body members 110 and 112 is provided for separating the sealed housing into chambers 122 and 124. Preferably, the central portion of the flexible member or diaphragm 120 is stiffened by a pair of disks 126 and 128 secured thereto. Preferably, protuberance means 130 extend inwardly from an end wall 132 of the member 112 to insure that there will always be a space between the diaphragm and the end wall. The housing chamber 122 is connected with the low pressure area or throat of the Venturi by passageways 134 and 136, and the chamber 124 is connected with a high pressure area of the Venturi by a passageway 138. As will be understood, the diaphragm will be positioned within the housing in accordance with the difference between the fluid pressures at the Venturi throat and at the passageway 138, which pressures are functions of the rate of fuel flow through the Venturi.

A bearing block 140 of insulating material is mounted within the body member 108, which block includes a pair of threaded nipples 142 and 144 extending through apertures in a wall 146 of the housing member 108. A gasket 148 is disposed between the mounting block and the wall 146, and nut members 150 and 152 are threaded onto the nipples 142 and 144, respectively, for drawing the mounting block and gasket tightly against the wall 146 and sealing the housing. The block 140 is provided with a pair of elongated apertures which extend through the nipples and through inner extensions 154 and 156, and shafts 158 and 160 respectively mounted in these bearing apertures. The shafts 158 and 160 provide the terminals 78 and 88 described above.

Gears 162 and 164 are respectively rotatably mounted on the inner ends of the shafts 158 and 160. The above mentioned movable contact elements or pointers 80 and 86 may be in the form of resilient leaf spring-like elements as shown and are respectively secured to the gears 162 and 164 for movement therewith. A pair of yokes or guide members 166 and 168 are mounted on the shafts for the purpose described below, and snap rings 170 and 172 fit into suitable annular grooves in the ends of the shafts for retaining the guide members and the gears on the shafts.

A member 174 formed from insulating material is disposed within the housing member 108 and includes opposite arcuate end sections 176 and 178 on which the above mentioned resistor coils 82 and 84 are wound. The member 174 is supported by arms 180 and 182 which are secured to the mounting block 140 and respectively have ends secured to the portions 176 and 178 of the member 174. It should be noted that the portions 176 and 178 of the member 174 are tapered so that the resistor coils 82 and 84 are tapered in a manner such that the resistance provided thereby varies lineally as the movable contacts 80 and 86 are advanced or retracted.

In order to actuate the movable contacts 80 and 86, means is provided for rotating the gears 162 and 164 in accordance with any movemnt of the diaphragm. More specifically the member 174 is provided with a central enlargement 184 which has an aperture 186 therethrough axially aligned with the diaphram and a counterbore 188 therin. A rod 190 has one end slidably disposed in the aperture 186 and has its opposite end extending into and connected with a double sided rack member 192. The rack member which is formed from insulating material is slidably disposed between the above mentioned guide members 166 and 168 which are also formed from insulating material and meshes with the gears 162 and 164. An internally threaded nut-like member 194 is also associated with the rack member and receives a threaded stem 196 which engages a pad 198 on the diaphragm. A compression spring 200 has one end disposed within the counterbore 188 and acts against the rack member so as normally to bias the rack membr to the position shown in FIG. 5, at which position, the gears and the movable contacts are located so that the resistance coils 82 and 84 are substantially fully in the circuit. In order to adjust the length and spring rate of the spring 200, a sheet material member 202 threadedly receives the spring as shown best in FIG. 7 and is provided with a flange 204 cooperable with an annular groove in the portion 184 of the member 174 for rotatably connecting the sheet material member 202 with the portion 184. It will be noted that the spring 200 effectively acts against the sheet material member 202 and that upon rotation of the sheet material member convolutions of the spring may be drawn into or forced from an inoperative position within the counterbore 188. The initial force of the spring may be adjusted independently of its length by relatively rotating the threaded stem 196 and the nut-like member 194 so as to shift the stem axially with respect to the rack member.

Figure 10:
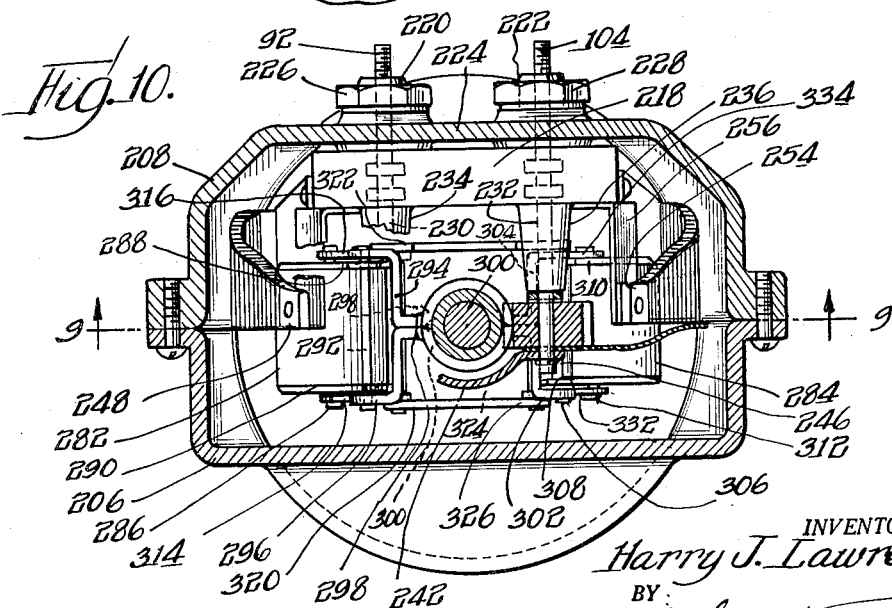
FIG. 10 is a sectional view taken along line 10—10 in FIG. 9.

In FIGS. 9 and 10 the device 28 for varying the flow of electrical current in response to the vehicle speed or engine performance is shown in detail. The device 28 comprises a pair of complementary housing members 206 and 208 which combine to provide a threaded nipple 210. The nipple 210 is adapted to be received by a threaded socket 212 provided in the housing of the transmission 38 normally to receive a coupling member of a standard speedometer cable. However, when the device 28 is installed, the coupling member 214 of the speedometer cable is applied to a threaded socket 216 provided by the housing members 206 and 208 in axial alignment with the threaded nipple 210. A mounting block 218 is disposed within the housing members and includes a pair of threaded nipples 220 and 222 which extend through suitable apertures in a wall 224 of the housing member 208. Nut members 226 and 228 are applied to the threaded nipples 220 and 222 for securing the mounting block in place. Metallic shafts 230 and 232 extend through the nipples 220 and 222 and inner extensions 234 and 236 of the mounting block, which shafts respectively provide the terminals 92 and 104 described above. Gears 238 and 240 are respectively rotatably mounted on the inner end portion of the shafts 230 and 232 and the movable contacts or pointers 94 and 102 are respectively connected to and movable with the gears. A member 242 of insulating material extends between and is applied to the free ends of the shafts, and snap rings 244 and 246 are applied to the ends of the shafts 230 and 232 respectively for retaining the member 242 and the gears.

The above mentioned resistance coil 96 is wound on a tapered member 248 which is supported by arms 250 and 252 connected to the mounting block and the coil 100 is wound on a similar member 254 supported from the mounting block by arms 256 and 257. It should be noted that the coils 96 and 100 are tapered so that the resistance provided thereby varies lineally.

A bearing 258 is mounted in complementary recesses formed in the nipple portions of the body members 206 and 208, and another bearing 260 is mounted in complementary recesses in the body members adjacent the socket portions 216. A shaft 262 is journalled in these bearings. A flange 264 is provided on the shaft for engagement with the bearing 260 to prevent axial movement of the shaft in one direction, and a sleeve 266 is secured to the shaft by means of a pin or the like 268 for engagement with the bearing 258 to prevent axial movement of the shaft in the opposite direction. The end of the shaft adjacent the transmission is provided with a socket 270 adapted to receive and interengage with a driving element 272 normally provided in the transmission for driving the speedometer cable. However, when the device 28 is installed, the speedometer cable 40 is applied to an extension 276 of the shaft 262, which extension interengages and drives the speedometer cable.

The gears 238 and 240 are actuated in accordance with the speed of rotation of the shaft 262 which, in turn, is driven in accordance with the vehicle or engine speed. To accomplish this, a double sided rack member 278 is slidably mounted on the shaft 262 and meshes with both of the gears. The rack member is normally biased to the position shown in FIG. 9 by a compression spring 280 which acts between the ends of the rack member and the sleeve 266. With the movable contact fingers 94 and 102 in the position shown in FIG. 9, the resistance coils 96 and 100 are substantially fully in the circuit, and centrifugal force means is provided for shifting the rack member 278 against the spring 280 to rotate the gears and thereby move the contact members along the coils to decrease the resistance in the circuit. This centrifugal force means comprises a pair of flyweights 282 and 284 respectively operatively connected with the rack member and with the sleeve 266 which is fixed with respect to the shaft. More specifically, a pin 286 extends through the weight member 282, and links 288 and 290 are connected with opposite ends of this pin and are also pivotally connected by means of a pin 292. The pin 292 is carried by spaced arm portions 294 and 396 of a pair of interconnected and complementary yoke members having central semicircular portions 298 and 300 disposed in an annular groove in the rack member. The yoke members include opposite end portions 302 and 304 which carry a pin 306. The pin 306, in turn, pivotally supports link members 308 and 310 which are connected with a pin 312 extending through the weight member 284. The pin 286 extending through the weight member 282 is also pivotally connected with links 314 and 316 which, in turn, are pivotally connected by a pin 318 to ears 320 and 322 extending upwardly from a flange 324 integral with the sleeve 266. Similarly, the pin 312 extending through the weight 284 is pivotally connected to ears 326 and 328 integral with the flange 324 by a pin 330 and links 332 and 334.

In order to adjust the length and spring rate of the spring 280, a nut-like sheet material member 336 threadedly receives a portion of the spring 280 and is rotatably disposed on the sleeve 266. The initial amount of compression or force of the spring 280 may be adjusted by axially positioning the member 336 by means of a nut member 338 threaded onto the sleeve 266.

A brief résumé of the manner in which the meter of the present invention functions to indicate engine efficiency or miles per gallon is as follows: Prior to starting of the engine and movement of the vehicle, the devices 26 and 28 are in the conditions shown best in FIGS. 5 and 9 with the movable contacts positioned so that all of the resistance coils are substantially entirely connected in the circuit and the device 22 is not energized. When the engine is started, the fuel flowing through the line 30 and the Venturi tube of the device 26 establishes a differential fluid pressure between the chambers 122 and 124 whereby the diaphragm is shifted toward the left as viewed in FIG. 5 and the movable contacts 80 and 86 are shifted so that portions of the coils 82 and 84 are effectively taken out of the circuit. This enables the current to flow so as to energize the coil 46 which causes the vanes 58 and 64 to be magnetized. Prior to movement of the vehicle the magnetized vanes 58 and 64 will repel each other so as to position the pointer to indicate zero miles per gallon, since the coil 44 is not energized so as to magnetize the vanes 56 and 60. However, when the vehicle begins to move, the flyweights of the device 28 are rotated and the centrifugal force created thereby causes the rack member 278 to be shifted so as to actuate the movable contacts 94 and 102 along the resistance coils 96 and 100 and thereby effectively take a portion of these coils out of the circuit. When this occurs the coil 44 of the device 22 is energized and the vanes 56 and 60 are magnetized. The magnetic force tending to repel the vane 56 from the fixed vane 60 opposes the magnetic force tending to repel the movable vane 58 from the fixed vane 64 so that the pointer 68 is moved along the scale 70 until these forces balance each other. When these magnetic forces are balanced the pointer indicates the engine efficiency or miles per gallon. It will be appreciated that the movable contacts in the devices 26 and 28 are positioned in accordance with the square of the rate of fuel flow and the square of the vehicle or engine speed since the pressure differential between the chambers in the device 26 varies in accordance with the rate of fuel flow and the centrifugal force provided by the weights varies in accordance with the square of the rate of rotation of the weight. However, as mentioned above, the resistance coils in the devices 26 and 28 are wound and tapered so that the resistance provided thereby varies lineally. In addition, the coils and vanes of the device 22 are constructed so that the repelling magnetic forces provided vary lineally with respect to variations in current flowing through the coils so that the scale 70 may be provided with easily readable lineal calibrations.

While the preferred embodiment of the present invention has been shown and described herein, it is obvious that many structural details may be changed without departing from the spirit and scope of the appended claims.

The invention is claimed as follows:

1. In an engine efficiency meter having electrical means for positioning a member in accordance with engine efficiency, a unit for controlling a portion of said electrical means in accordance with fuel flow to an engine, said unit comprising sealed housing means, flexible diaphragm means disposed within and separating said housing means into first and second chambers, means connectable in a fuel line for establishing different fuel pressures at different areas in accordance with flow of fuel therethrough, passageway means connecting one of said areas with said first chamber, passageway means connecting the other of said areas with said second chamber, said chamber means being substantially completely filled with fuel, variable resistance means disposed in one of said chambers and immersed in the fuel therein, and means actuated by said diaphragm for operating said variable resistance means.

2. In an engine efficiency meter, a control unit operable in accordance with fuel flow to an engine, said unit comprising housing means providing first and second fluid chamber means, a flexible diaphragm disposed within said housing means and separating said chamber means, means connectable in a fuel line for establishing different fuel pressures at spaced areas, passageway means connecting one of said areas with said first chamber means, passageway means connecting said other area with said second chamber means, a pair of series connected resistance coils disposed in one of said chamber means, a pair of contacts respectively movable along said resistance coils, and means actuated by said diaphragm for moving said contacts substantially in unison.

3. A unit, as defined in claim 2, wherein said coils are symmetrically formed so as to provide a substantially lineally variable resistance.

4. A unit, as defined in claim 2, wherein said means for moving said contacts comprises a pair of toothed members respectively connected with said contacts, and another toothed member simultaneously meshing with said first mentioned toothed members and actuated by said diaphragm means.

5. In an engine efficiency meter having electrical means for positioning a member in accordance with engine efficiency, a control unit for controlling a portion of said electrical means in accordance with fuel flow to an engine, said unit comprising rigid housing means providing first and second sealed chamber means, slack diaphragm means disposed within said housing means and separating said chamber means, means connectable in a fuel line for establishing different fluid pressures at spaced areas in accordance with fuel flow therethrough, passageway means connecting one of said areas with said first chamber means, passageway means connecting the other of said areas with said second chamber means, variable resistance means disposed in one of said chamber means adjacent said diaphragm means, actuating means engageable with said diaphragm means for actuating said variable resistance means, compression spring means biasing said actuating means towards said diaphragm means, and means for adjusting the effective length and spring rate of said compression spring.

6. A control unit, as defined in claim 5, which includes additional means for initially adjusting the initial force of said compression spring.

References Cited in the file of this patent

UNITED STATES PATENTS

| | | |
|---|---|---|
| 1,214,286 | Douglas | Jan. 30, 1917 |
| 1,501,189 | Record | July 15, 1924 |
| 1,654,421 | Knerr | Dec. 27, 1927 |
| 1,719,556 | McCoy | July 2, 1929 |
| 1,952,921 | Jewell | Mar. 27, 1934 |
| 2,023,568 | Albersheim et al. | Dec. 10, 1935 |
| 2,178,422 | Heagney | Oct. 31, 1939 |
| 2,298,412 | Remde | Oct. 13, 1942 |
| 2,422,240 | Jackes | June 17, 1947 |
| 2,470,768 | Felburg | May 24, 1949 |
| 2,488,221 | Moore | Nov. 15, 1949 |
| 2,614,424 | Thoresen | Oct. 21, 1952 |
| 2,621,513 | Zschokke et al. | Dec. 16, 1952 |
| 2,701,960 | Irwin | Feb. 15, 1955 |
| 2,767,580 | Bevins et al. | Oct. 23, 1956 |
| 2,789,190 | Statham | Apr. 16, 1957 |
| 2,796,762 | Touchman | June 25, 1957 |